(No Model.) 3 Sheets—Sheet 1.

G. WORTHINGTON & E. J. PARVIN.
FIBER MACHINE.

No. 304,680. Patented Sept. 2, 1884.

Attest:
Charles Pickles
Cora E. Hunt

Inventors
George Worthington
Enoch J. Parvin
by C D Moody
atty (No Model.) 3 Sheets—Sheet 2.

G. WORTHINGTON & E. J. PARVIN.
FIBER MACHINE.

No. 304,680. Patented Sept. 2, 1884.

Attest,
Charles Piehle
Cora E. Hunt

Inventors
George Worthington
Enoch J. Parvin
by C. D. Moody
atty

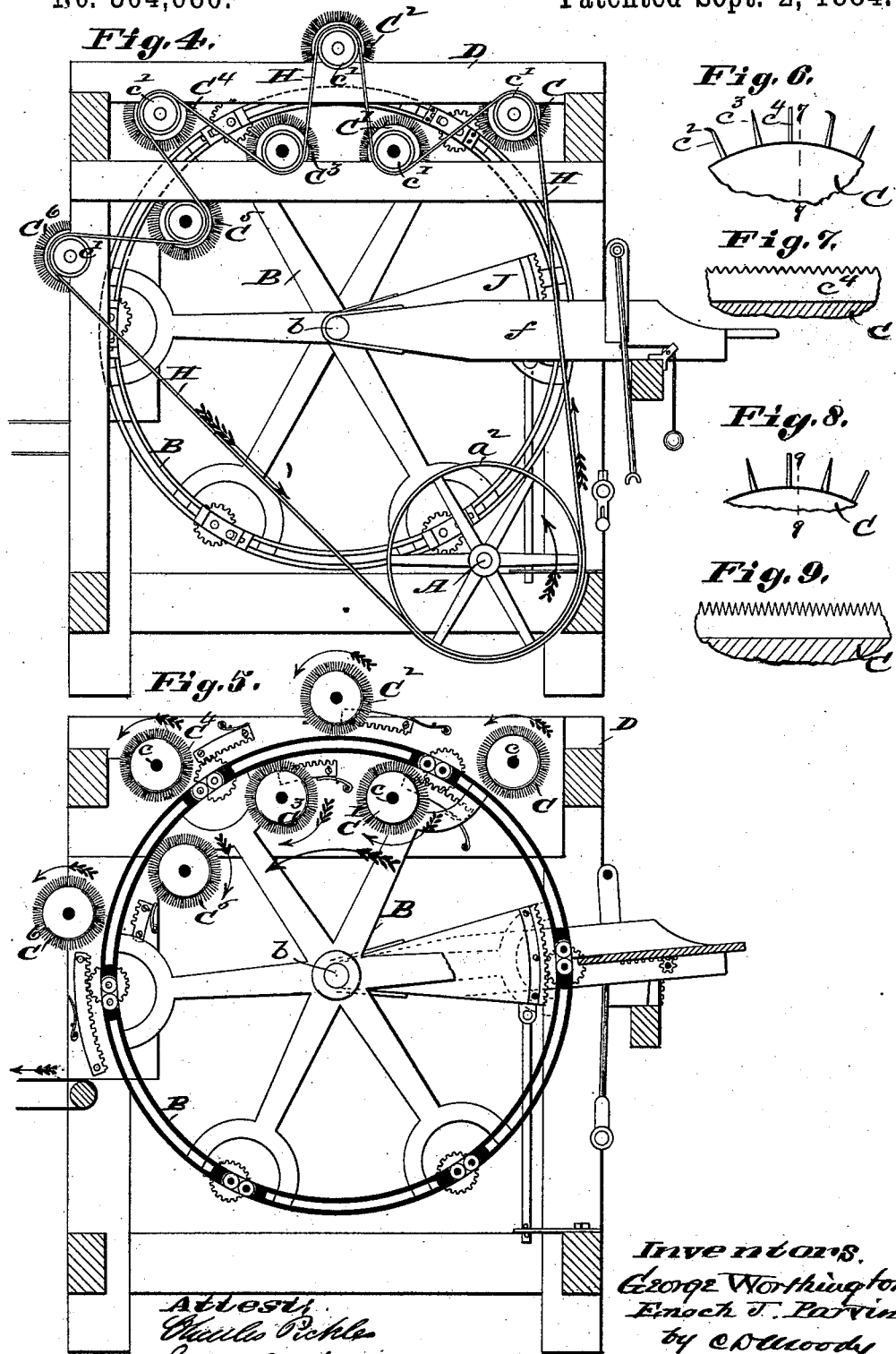

UNITED STATES PATENT OFFICE.

GEORGE WORTHINGTON, OF PITTSFIELD, ILLINOIS, AND ENOCH J. PARVIN, OF McKINNEY, TEXAS.

FIBER-MACHINE.

SPECIFICATION forming part of Letters Patent No. 304,680, dated September 2, 1884.

Application filed March 29, 1884. (No model.)

*To all whom it may concern:*

Be it known that we, GEORGE WORTHINGTON and ENOCH J. PARVIN, residents, respectively, of Pittsfield, Pike county, Illinois, and McKinney, Collin county, Texas, have jointly made a new and useful Improvement in Fiber-Machines, of which the following is a full, clear, and exact description, reference being had to the annexed drawings, making part of this specification, in which—

Figure 1:
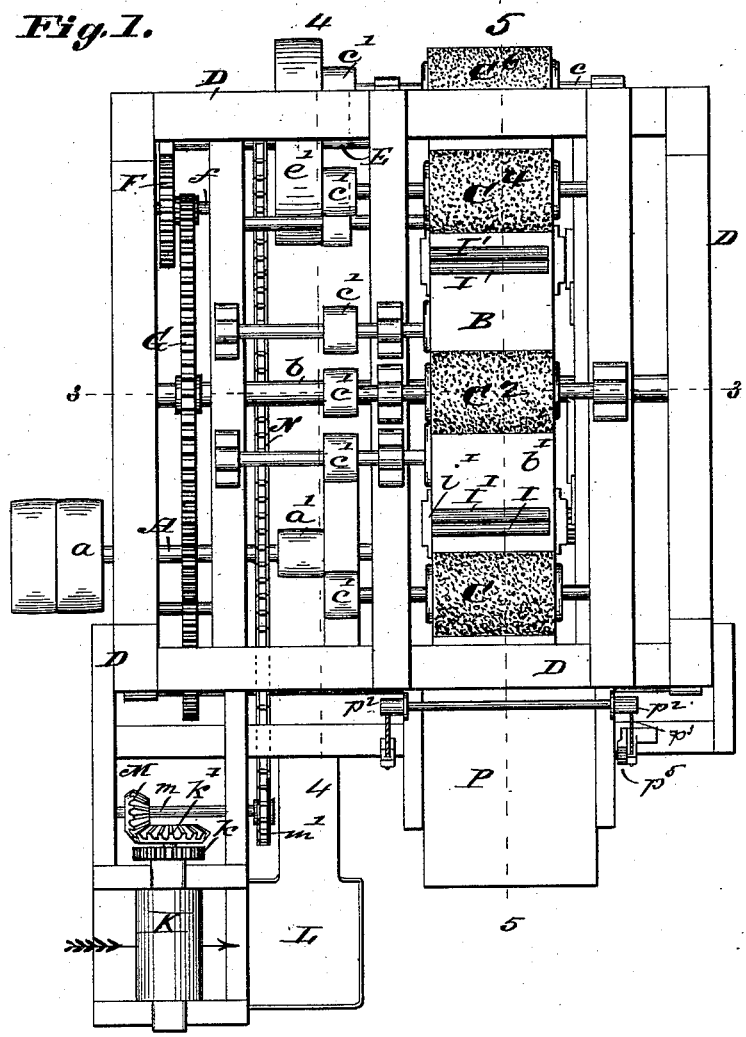
Figure 2:
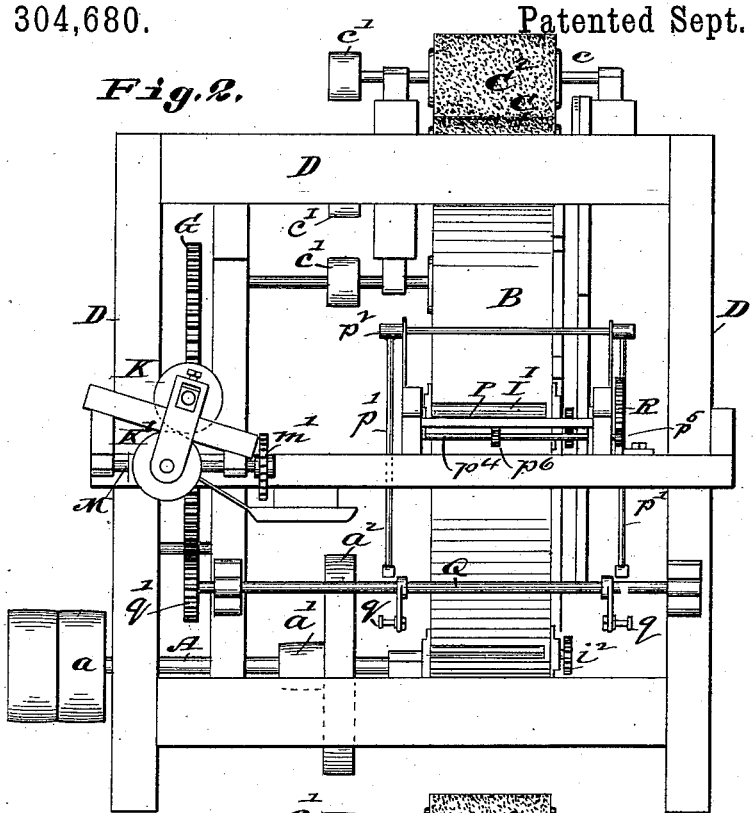
Figure 3:
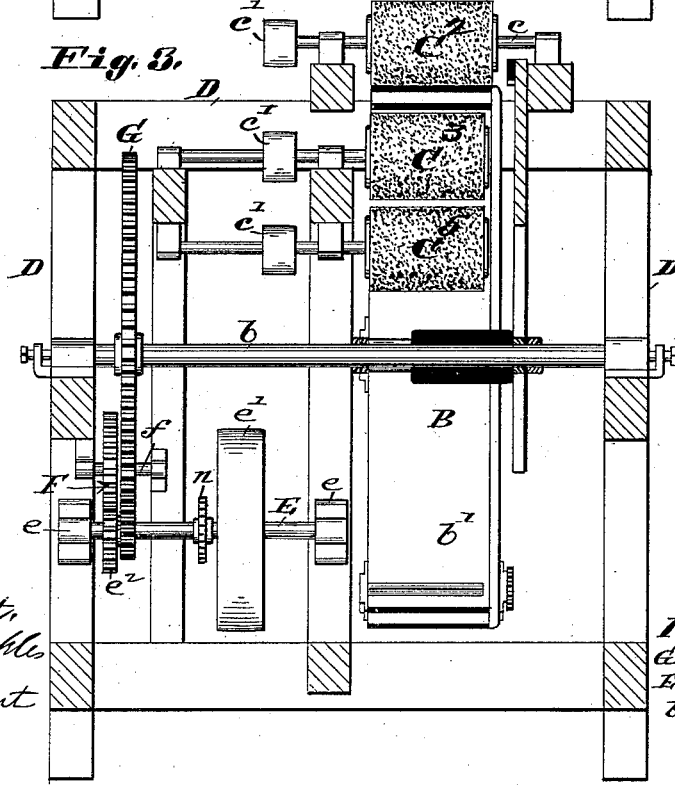

Figure 1 is a plan of the improved machine; Fig. 2, a front elevation; Fig. 3, a vertical cross-section on the line 3 3 of Fig. 1; Fig. 4, a vertical longitudinal section on the line 4 4 of Fig. 1; Fig. 5, a vertical longitudinal section on the line 5 5 of Fig. 1; and Figs. 6, 7, 8, 9, details upon an enlarged scale, Fig. 6 being an end view showing a portion of one of the first set of rolls to which the leaves from which the fiber is made are subjected after entering the machine; Fig. 7, a section on the line 7 7 of Fig. 6; Fig. 8, an end view showing a portion of one of the second set of rolls to which the leaves are subjected, and Fig. 9 a section on the line 9 9 of Fig. 8.

The same letters of reference denote the same parts.

The present invention is adaptable to fibers of various plants; but it is especially designed for separating the fiber of plants found in Mexico—such as lechugilla, Spanish dagger, and similar plants.

Regarded in a general way, the improved machine consists of a movable series of pairs of rolls, in combination with a device or devices for separating the fiber from the other portion of the leaves or stalks from which the fiber is obtained, the several pairs of rolls being adapted to receive and hold the leaves or stalks, the series being moved so as to carry the leaves or stalks past the separating devices, so as to subject the leaves or stalks to the action of the separating devices, and the rolls of each pair being operated to move the leaves or stalks forward and backward between rolls, so as to subject all parts of the leaves or stalks to the separating devices.

The invention is carried out, preferably, by means of a circular frame adapted to be rotated upon its center, and provided with a series of pairs of rolls, which are carried around with the frame. The stalks or leaves from which the fiber is to be separated are fed into the machine so as to be received at one end between a pair of the series of rolls. After being thus introduced, the stalks or leaves are carried around with the frame, and in their movement subjected first to the action of brushes or analogous devices, which serve to separate the fiber from the remaining portion of the leaves or stalks; and, second, to the action of brushes or analogous devices, which serve to clean the separated fiber, after which the fiber is discharged from the machine. Two or more brushes are used, and they are located so that the rolls in their movement are carried between the brushes, and the rolls are so operated as to cause them to feed the stalks or leaves forward and backward through the rolls, and thereby expose first one end and then the other end of the stalks or leaves to the action of the brushes, and in that manner, by the time the rolls shall have passed the brushes, to cause all parts of the stalks or leaves to be thoroughly subjected to the action of the brushes. The stalks or leaves are fed into the various pairs of rolls as they successively, in the rotation of the frame, come opposite the point where the leaves or stalks are introduced into the machine; and in this manner the operation of separating the fiber becomes a continuous one, the stalks or leaves being fed into the machine at one side thereof as the fiber is being discharged from the machine at the other side thereof, and the refuse of the stalks or leaves being discharged in another direction.

A, Figs. 1, 2, 4, represents the driving-shaft of the machine. Power is communicated to the shaft by means of the pulley $a$, and the power of the shaft, in turn, is transmitted by means of the pulleys $a'$ $a^2$. The pulley $a'$ is for operating the circular frame B, and the pulley $a^2$ is for operating the system of brushes C C' $C^2$ $C^3$ $C^4$ $C^5$ $C^6$. The motion is communicated to the frame B as follows:

D represents a suitable frame-work for sustaining the various parts of the mechanism.

E, Fig. 3, represents a shaft journaled in the frame at $e$ $e$, and provided with a pulley, $c'$, and a gear, $e^2$. The motion of the pulley $a'$ is communicated to the pulley $e'$ by means of a suitable belt. The gear $e^2$ engages with the gear F upon the shaft $f$, Fig. 3. This last-named shaft $f$ is also provided with a pinion, (not shown in Fig. 3,) it being directly behind another gear, G, with which the pinion engages. The motion of the shaft E is thus communicated to the gear G, and this gear G being fastened to the shaft $b$ of the circular frame B, the motion of the pulley $a'$ is transmitted to the circular frame. The motion of the pulley $a^2$ is communicated to the brushes above named as follows: The brushes C C', &c., are, respectively, attached to the shaft $c$, and these shafts, in turn, are provided with pulleys $c'$, &c. A belt, H, is carried around the pulleys $a^2$ $c'$, &c., in the manner shown in Fig. 4, and by means of it the desired motion is communicated to the brushes, and as indicated by the arrows in Fig. 4.

I I' I I', &c., represent the various pairs of rolls with which the frame B is provided. They are arranged at regular intervals around the rim of the frame, and are attached to shafts $i$, which are journaled in bearings $i'$ in the rim $b'$. One of the shafts $i$ of each pair of rolls I I' is provided with a pinion, $i^2$. There are a series of racks, J J' J$^2$, &c., arranged around the frame D, and in positions, respectively, and as shown, to engage the pinions $i^2$, as the various pairs of rolls are carried around with the frame B, and whenever the pinion $i^2$ engages a rack, J,&c., the rolls I I' are rotated, and when thus rotated the stalks, &c., are moved between the rolls I I'. The direction of movement of the rolls and stalks, &c., is according to the location of the rack J. If the rack is within the rim $b'$, the stalks are fed in the direction of the center of the frame B, and if without the rim, the stalks are fed in the opposite direction. The first rack, J, is opposite the point at which the stalks are fed into the machine. The pinion $i^2$ engages with it, and the stalks in consequence are fed part way into the rolls I I', and in this position, with one end hanging without the rim $b'$ of the frame B, the stalks are carried past the first, C, of the brushes. This brush is adapted for the initial work in separating the fiber, and to that end is made with teeth $c^2$ $c^3$, Fig. 6. This brush also may have serrated blades $c^4$, Figs. 6, 7. The action of the brush C upon that portion of the stalks which is exposed thereto serves to largely remove the remaining portion of the stalks from the fiber. The pinion $i^2$ in the movement of the frame B is then brought into engagement with the rack J'. This causes the rolls I I' to be rotated again in the same direction in which they were rotated by means of the rack J, and the result is the stalks are fed farther, but not entirely, through the rolls I I', and so as to expose that end of the stalks which is within the rim $b'$ to the action of the second brush, C'. This brush is constructed similarly to the brush C, and it acts to remove the refuse from the inner end of the stalks. What now remains held in the rolls I I' is mainly the fiber of the stalks; but in order to more effectually separate the fiber it is subjected to the action of the brushes C$^2$ C$^3$, successively. The rack J$^2$ causes the rolls I I' to be rotated in the opposite direction, and so as to subject the outer end of the fiber to the action of the brush C$^2$, after which the pinion $i^2$ engages with the rack J$^3$, and the inner end of the fiber is, in consequence, subjected to the action of the brush C$^3$. The brushes C$^2$ C$^3$ are suitably adapted for this part of the work, and are made, preferably, as shown in Figs. 8,9. The fiber is now carried still farther around in the frame, and by means of additional racks, J$^4$, &c., suitably arranged therefor, the fiber is caused to be subjected to the action of the remaining brushes, C$^4$ C$^5$ C$^6$, respectively. These last-named brushes are more for the purpose of cleaning the now separated fiber, and to that end are suitably constructed.

We do not desire to be confined to any special number of brushes nor to any special construction of brushes; but we preferably employ about as many as are shown in Figs. 4, 5, and they are preferably constructed as described. After the fiber has passed the last brush of the series, the pinion $i^2$ comes in contact with a longer rack, J$^7$, than the racks previously mentioned. This last-named rack is upon the outer side of the rim $b'$, and it causes the rolls I I' to be rotated sufficiently to discharge the fiber therefrom and from the machine.

Two additional features of the machine will now be described. It is frequently desirable for the leaves, &c., to be subjected to a preliminary crushing treatment before passing them into the rolls I I'. To this end the leaves are passed through the rolls K K', and from these rolls they fall into the receptacle L. The rolls K K' are driven preferably from the shaft E, as follows: The rolls are geared together at $k$, and the shaft of one of the rolls is provided with the bevel-gear $k'$. This last-named gear engages with the pinion M on the shaft $m$, which also is provided with the sprocket-wheel $m'$. A chain, N, leads from the wheel $m'$ around a wheel, $n$, upon the shaft E. One attendant passes the leaves through the rolls K K', and another attendant takes them in their crushed form from the receptacle L and places them upon the table P, Figs. 1, 4, 5, which is the preferable means employed in feeding the leaves into the rolls I I'. The table, as each pair I I' of rolls is filled with the leaves, is adapted to follow the frame B in its movement until the leaves shall have been fairly delivered into the rolls. This is accomplished, preferably, as follows: The table, by means of the arms $p$ $p$, is journaled upon the shaft $b$. It is also provided with the arms $p'$ $p'$, which are pivoted to the table at $p^2$, and at their lower ends adapted to receive the wrist-pins $q\ q$ of the crank-shaft Q, Figs. 2, 4. This last-named shaft is furnished with the pinion $q'$, which engages with the gear G, and is thereby adapted to be rotated at a suitable rate for operating the table P. As the shaft Q is rotated, the pins $q\ q$ come beneath the arms $p'\ p'$, and thereby lift the table P on its bearing $b$, the movement being timed to keep the table during its upward movement abreast of the pair of rolls I I', into which the leaves are being fed. In this manner a support is provided for the leaves until they shall have been properly entered into the rolls, by which time the pins $q\ q$ will have reached their uppermost limit. The table and arms $p'\ p'$ then drop, and the arms $p'\ p'$, when free of the pins $q\ q$, are, by means of the weighted cords $p^3\ p^3$, drawn outward into position to be again lifted as the pins $q\ q$ come around again. The table is provided with a cross-shaft, $p^4$, having at the side of the table a pinion, $p^5$, and another pinion, $p^6$, beneath the table, and as the table is lifted the pinion $p^5$ engages with a rack, R. This causes the shaft $p^4$ and pinion $p^6$ to turn. The pinion $p^6$ engages with a rack, $p^7$, on the under side of the table, and the table in consequence (it being adapted to be slipped upon its arms $p\ p$) is, as it rises and falls, moved toward and from the frame B, and the leaves thereby, as the table rises, brought closely up to the rolls I I'.

We claim—

1. The combination, in a fiber-machine, of a movable series of pairs of rolls and a fiber-separating device or devices, substantially as described.

2. The combination, in a fiber-machine, of a movable series of pairs of rolls and a fiber-separating device or devices, the several pairs of rolls being adapted to receive and hold the leaves or stalks, the series being moved to carry the leaves or stalks past the separating devices, and the rolls of each pair of rolls being operated to move the leaves or stalks for the purpose of subjecting all parts of the leaves or stalks to the separating devices.

3. The combination, in a fiber-machine, of a movable pair of rolls, I I', and a brush, C, substantially as described.

4. The combination, in a fiber-machine, of a pair of rolls, I I', and a fiber-separating device, C, said rolls being adapted to receive and carry the leaves, &c., past the device C, for the purpose described.

5. The combination, in a fiber-machine, of a series of pairs of rolls and a fiber-separating device, the series and the separating device having a relative movement to enable the leaves, &c., held in the rolls to be subjected to the action of the separating device.

6. The combination, in a fiber-machine, of the rotating frame B, having the rolls I I', &c., and the brushes C C'.

7. The combination, in a fiber-machine, of the rotating frame B, having the rolls I I', &c., and the series of brushes C C' $C^2$, &c.

8. The combination, in a fiber-machine, of the rotating frame B, carrying the rolls I I', &c., and the table P.

9. The combination of the rotating frame B and the table P, said table being adapted to keep abreast of the rolls I I' as the leaves, &c., are being entered in the rolls.

10. In a fiber-machine, a pair of rolls, I I', said rolls being adapted to receive and hold the leaves, &c., from which the fiber is prepared, and to be rotated upon their journals, respectively, to enable the leaves to be passed forward and backward through the rolls, for the purpose set forth.

11. The combination, as described, of the rotating frame B, the rolls I I', &c., the pinions $i^2\ i^2$, and the racks J J, &c.

12. The combination, as described, of the rotating frame B, the rolls I I', the pinion $i^2$, and the rack J'.

13. The combination, as described, of the rolls K K', receptacle L, and table P.

14. The combination, as described, of the table P, the arms $p'\ p'$, the shaft Q, and pins $q\ q$.

15. The combination, as described, of the table P, arms $p\ p$, shaft $p^4$, pinions $p^5\ p^6$, racks R $p^7$, and frame B.

16. The combination, as described, of the frame B, the rolls I I', and the brush C, the rim $b'$ being closed to support the ends of the leaves.

Witness our hands this 15th March, 1884.

GEO. WORTHINGTON.
ENOCH J. PARVIN.

Witnesses:
CHARLES D. MOODY,
CORA E. HUNT.